United States Patent
Chang

(10) Patent No.: US 8,115,990 B2
(45) Date of Patent: Feb. 14, 2012

(54) DISPLAY DEVICE AND PIXEL STRUCTURE THEREOF

(75) Inventor: Hsi-Ming Chang, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 317 days.

(21) Appl. No.: 12/637,716

(22) Filed: Dec. 14, 2009

(65) Prior Publication Data

US 2011/0085225 A1 Apr. 14, 2011

(30) Foreign Application Priority Data

Oct. 13, 2009 (TW) .............................. 98218860 U

(51) Int. Cl.
*G02B 26/00* (2006.01)

(52) U.S. Cl. .......................... 359/296; 359/298; 345/107

(58) Field of Classification Search .................. 359/296, 359/298; 345/107
See application file for complete search history.

(56) References Cited

U.S. PATENT DOCUMENTS

| 3,668,106 | A | 6/1972 | Ota | |
|---|---|---|---|---|
| 5,344,594 | A | 9/1994 | Sheridon | |
| 6,570,700 | B2 * | 5/2003 | Engler et al. | 359/296 |
| 6,751,007 | B2 | 6/2004 | Liang et al. | |
| 2002/0131151 | A1 * | 9/2002 | Engler et al. | 359/296 |
| 2003/0214697 | A1 * | 11/2003 | Duthaler et al. | 359/296 |
| 2005/0162378 | A1 | 7/2005 | Zhou et al. | |

FOREIGN PATENT DOCUMENTS

| TW | 200602779 | 1/2006 |
|---|---|---|
| TW | 200632498 | 9/2006 |
| TW | I281081 | 5/2007 |

* cited by examiner

*Primary Examiner* — Evelyn A. Lester
(74) *Attorney, Agent, or Firm* — Winston Hsu; Scott Margo

(57) ABSTRACT

A pixel structure of a display device disposed on a substrate includes a plurality of sub-pixel structure. Each sub-pixel structure includes a light-absorption region, a reflection region, a first electrode disposed in the light-absorption region, a second electrode disposed in the reflection region, and a plurality of charge-carrying balls disposed over the first electrode and the second electrode. Each of the charge-carrying balls includes a white portion and a black portion. The white portion has a first conductivity type, and the black portion has second conductivity type.

25 Claims, 10 Drawing Sheets

DISPLAY DEVICE AND PIXEL STRUCTURE THEREOF

BACKGROUND OF THE INVENTION

1. Field of the Invention

The present invention relates to a display device and its pixel structure, and more particularly, to a low power consumption flexible display device and a pixel structure thereof.

2. Description of the Prior Art

Reading words or pictures printed on papers is the most well-accepted reading method by human beings. As paper printing techniques advance and printing costs reduce, extensive amount of papers are being used for printing and seen to be irreplaceable by any sort of electronic display devices. However, as display technique advances, it is made possible that in the near future, papers may be replaced by a flexible display device. Like papers, the flexible display device is thin in profile, small in size, light in weight, easy to carry and flexible in shape; therefore, it is expected that the flexible display device can be applied in electronic papers or electronic books, replacing conventional papers and books. However, those conventional flexible display devices still possess some issues to be solved such as high power consumptions.

SUMMARY OF THE INVENTION

It is one of the objectives of the present invention to provide a low power consumption display device and a pixel structure thereof.

According to the present invention, the present invention provides a pixel structure, including a substrate, a first electrode, a second electrode, and a plurality of charge-carrying balls. The substrate includes a light-absorption region and a reflection region. The first electrode is disposed in the light-absorption region of the substrate, and the second electrode is disposed in the reflection region of the substrate. The charge-carrying balls are disposed on the first electrode and the second electrode, and each of the charge-carrying balls includes a white portion and a black portion, wherein the white portion has a first conductive type and the black portion has a second conductive type.

According to the present invention, the present invention further provides a display device, including a plurality of pixel structures disposed on a substrate, and each of the pixel structures including a plurality of sub-pixel structures. Each of the sub-pixel structures includes a light-absorption region, a reflection region, a first electrode, a second electrode, and a plurality of charge-carrying balls. The first electrode is disposed in the light-absorption region of the substrate, and the second electrode is disposed in the reflection region of the substrate. The charge-carrying balls are disposed on the first electrode and the second electrode, and each of the charge-carrying balls includes a white portion and a black portion, wherein the white portion has a first conductive type and the black portion has a second conductive type.

The pixel structure of the display device of the present invention includes a light-absorption region and a reflection region. The light-absorption region and the reflection region have different electrodes with different polarities and the different polarities may be achieved by applying different voltages. In a bright state, the charge-carrying balls are attracted to the light-absorption region, and the white portion of each of the charge-carrying balls faces the display side to show the bright state. On the other hand, in a dark state, the charge-carrying balls are attracted to the reflection region, and the black portion of each of the charge-carrying balls faces the display side to show the dark state. Furthermore, with the installation of color filters, the display device of the present invention can also provide color display features.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
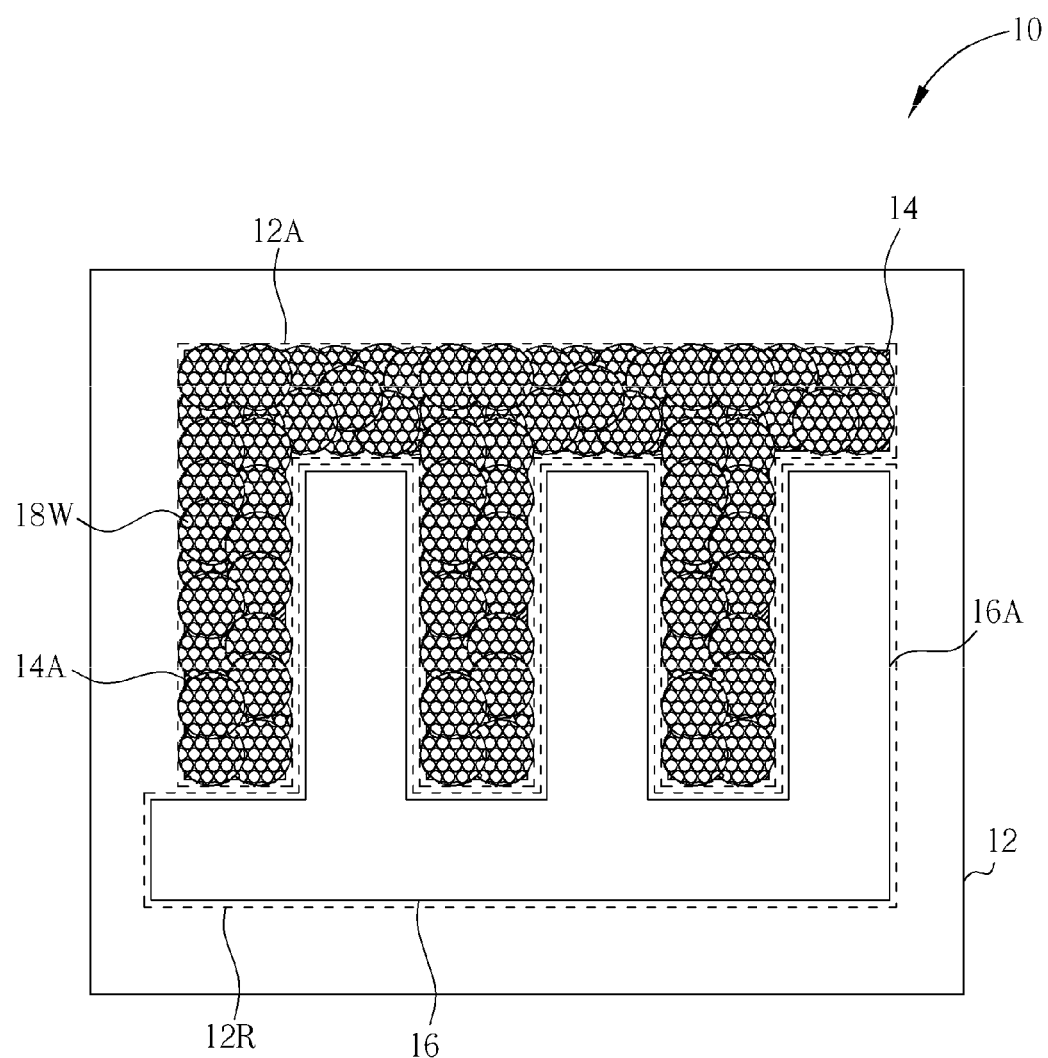
FIG. 1 to FIG. 4 are schematic diagrams of the pixel structure of the display device in accordance to a preferred embodiment of the present invention.
Figure 2:
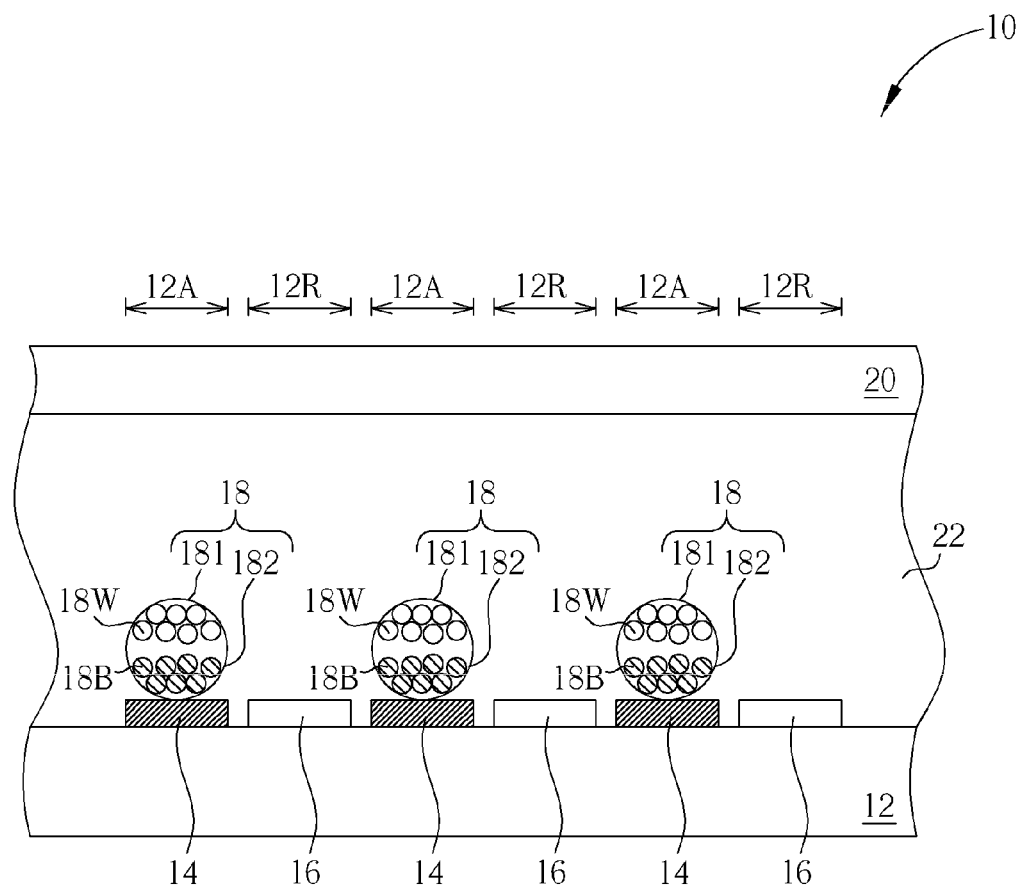
Figure 3:
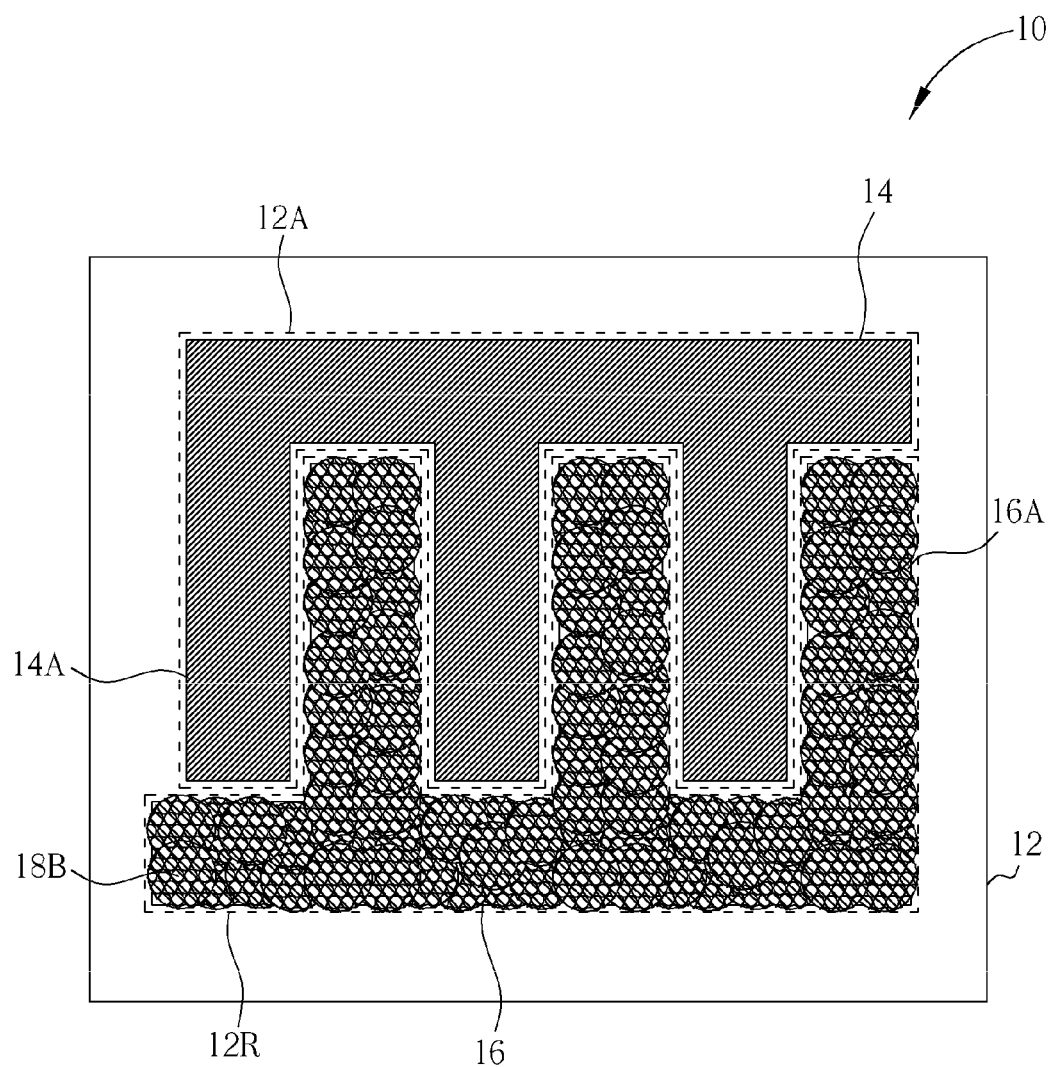
Figure 4:
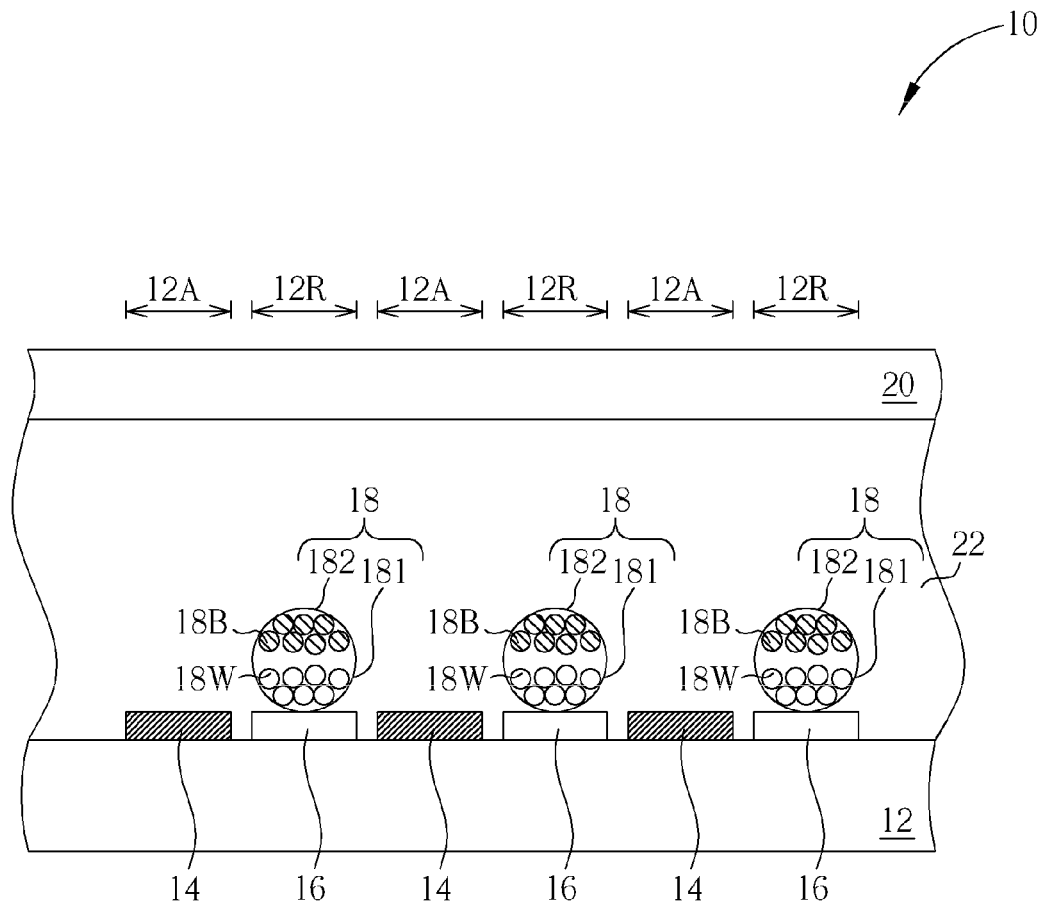

Referring to FIG. 1 to FIG. 4, FIG. 1 to FIG. 4 are schematic diagrams of the pixel structure of the display device in accordance to a preferred embodiment of the present invention. FIG. 1 and FIG. 2 are schematic diagrams of the pixel structure of the display device in a bright display state, and FIG. 3 and FIG. 4 are schematic diagrams of the pixel structure of the display device in a dark display state. In order to demonstrate the characteristics of the present invention clearly, FIG. 1 and FIG. 3 are top view diagrams, whereas FIG. 2 and FIG. 4 are cross-sectional diagrams. The display device in accordance to the present embodiment includes a plurality of pixel structures 10 disposed on a substrate 12. The substrate 12 may be a flexible substrate. Each of the pixel structures 10 includes a light-absorption region 12A, a reflection region 12R, a first electrode 14 disposed in the light-absorption region 12A of the substrate 12, a second electrode 16 disposed in the reflection region 12R of the substrate 12, and a plurality of charge-carrying balls 18 disposed on the first electrode 14 and the second electrode 16. The first electrode 14 and the second electrode 16 are disposed on a same plane, but are not limited. Each of the charge-carrying balls 18 includes a white portion 181 and a black portion 182. In accordance to the present embodiment, the white portion 181 of each of the charge-carrying balls 18 includes a plurality of white particles 18W, and the black portion 182 of each of the charge-carrying balls 18 includes a plurality of black particles 18B. The white particles 18W have a first conductive type, and the black particles 18B have a second conductive type. In addition, the white particles 18W and the black particles 18B, which can be driven by an electric field, are able to move within the charge-carrying balls 18. In accordance to the present embodiment, the white particles 18W are positively charged and the black particles are negatively charged, but are not limited. The pixel structure 10 further includes another substrate 20 (not illustrated in FIG. 1 and FIG. 3), disposed in opposite to the substrate 12. In addition, a fluid layer 22 (not illustrated in FIG. 1 and FIG. 3) is disposed between the substrate 12 and the substrate 20 so that the charge-carrying balls 18 driven by the electric field can move in the fluid layer 22.

In accordance to the present embodiment, the first electrode 14 includes a plurality of first bar electrodes 14A, the second electrode 16 includes a plurality of second bar electrodes 16A, and the first bar electrodes 14A and the second bar electrodes 16A are interdigitatedly arranged, but the patterns of the first electrode 14 and the patterns of the second electrode 16 are not limited. In addition, since the display device in accordance with the present invention is a reflective type display device, the material of the first electrode 14 includes a light-absorbing conductive material which absorbs incoming lights to avoid reflections. On the other hand, the material of the second electrode 16 includes a reflective conductive material which reflects the incoming lights.

As illustrated in FIG. 1 and FIG. 2, in a bright display state, a voltage having a first conductive type (positively charged in this case) is applied to the first electrode 14 of the pixel structure 10 of the display device, and no voltage is applied to the second electrode 16 of the pixel structure 10 of the display device. At this point, the charge-carrying balls 18 are substantially disposed in the light-absorption region 12A, the black particles 18B of the charge-carrying balls 18 are attracted by the positive charge of the first electrode 14, and the black particles 18B of the charge-carrying balls 18 are substantially aligned facing a side of the first electrode 14; while the white particles 18W are substantially aligned facing an opposite side with respect to the first electrode 14 (i.e. facing the display side). Under such configurations, the incoming lights entering the light-absorption region 12A of the pixel structure 10 would shine on the white particles 18W of the charge-carrying balls 18, while the incoming lights entering the reflection region 12R are reflected by the second electrode 16 so that the pixel structure 10 shows the bright state. Furthermore, adjusting the voltages of the first electrode 14 and the second electrode 16 changes the internal electric field of the pixel structure 10 so that the grey scale value of the display is controlled.

As illustrated in FIG. 3 and FIG. 4, when the pixel structure 10 of the display device in accordance to the present invention shows a dark display state, a voltage having a second conductive type (negatively charged in this case) is applied to the second electrode 16 of the pixel structure 10 of the display device, and no voltage is applied to the first electrode 14 of the pixel structure 10 of the display device. At this point, the charge-carrying balls 18 are substantially disposed in the reflection region 12R, the white particles 18W of the charge-carrying balls 18 are attracted by the negative charge of the second electrode 16, and the white particles 18W of the charge-carrying balls 18 are substantially aligned facing a side of the second electrode 16. In contrast, the black particles 18B are substantially aligned facing an opposite side with respect to the second electrode 16 (i.e. facing the display side). Under such configurations, the incoming lights entering the reflection region 12R of the pixel structure 10 would shine on the black particles 18B of the charge-carrying balls 18, and the incoming lights entering the light-absorption region 12A would be absorbed by the first electrode 14 without having reflections, so that the pixel structure 10 shows the dark state.

According to the passages above, based on the image signals received, the display device in accordance to the present invention can drive the different pixel structures to show either the bright state or the dark state to compose the desired black and white image display. In addition, the display device in accordance with the present invention only consumes power during frame-refreshments, and the display device in accordance to the present invention is a reflective type display device; therefore, the display device in accordance to the present invention has the advantage of low power consumption.

Figure 5:
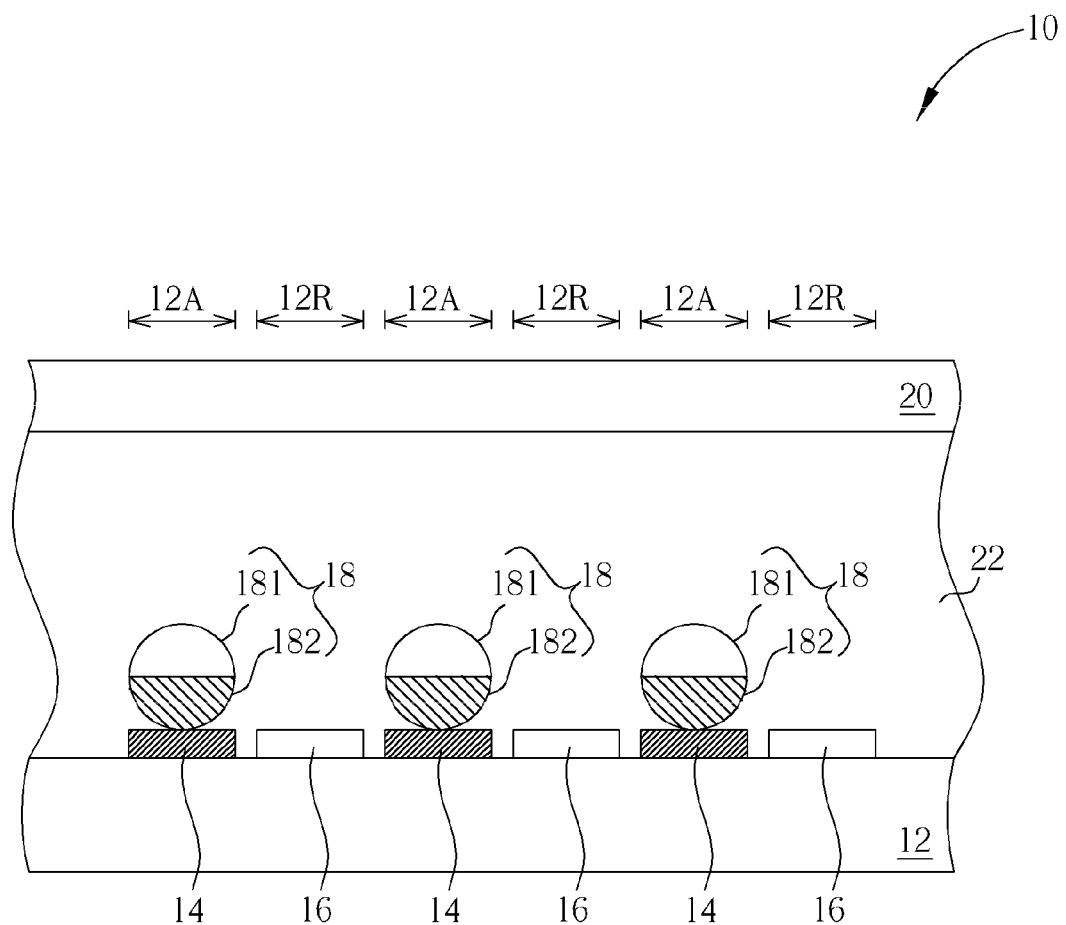
FIG. 5 is a schematic diagram of the charge-carrying balls in accordance to another preferred embodiment of the present invention.

In previous described embodiments, the charge-carrying balls 18 are twist balls. Driven by the electric field, the white particles 18W are substantially located within a hemisphere of each of the charge-carrying balls 18, and the black particles 18B are substantially located within the other hemisphere of each of the charge-carrying balls 18. However, the charge-carrying balls 18 may also be other types of charge-carrying ball structures or ball-like structures. Referring to FIG. 5, FIG. 5 is a schematic diagram of the charge-carrying balls in accordance to another preferred embodiment of the present invention. As illustrated in FIG. 5, the white portion 181 of each of the charge-carrying balls 18 in accordance to the present embodiment is a white hemisphere, and the black portion 182 of each of the charge-carrying balls 18 in accordance to the present embodiment is a black hemisphere. Driven by the electric field, the charge-carrying balls 18 can move within the fluid layer 22 freely, but the white hemisphere and the black hemisphere in each of the charge-carrying balls 18 do not respond to the relative movements of the charge carrying balls 18.

Figure 6:
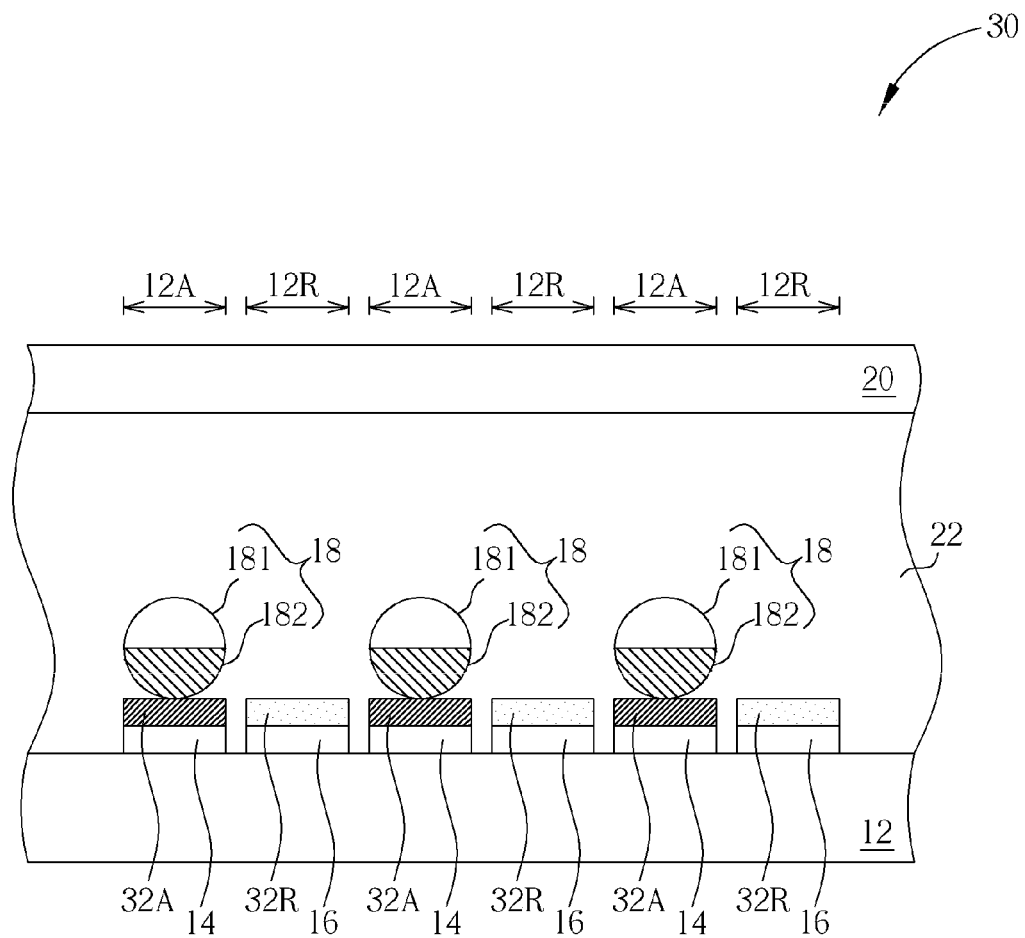
FIG. 6 is a schematic diagram of the pixel structure of the display device in accordance to another preferred embodiment of the present invention.

Referring to FIG. 6, FIG. 6 is a schematic diagram of the pixel structure of the display device in accordance to another preferred embodiment of the present invention. To simplify the description and for the convenience of comparison between each of the embodiments of the present invention, identical elements are denoted by identical numerals. Also, only the differences are illustrated, and repeated descriptions are not redundantly given. As illustrated in FIG. 6, a pixel structure 30 of the display device in accordance to the present embodiment further includes a light-absorbing layer 32A disposed on a first electrode 14 in a light-absorption region 12A, and a reflective layer 32R disposed on a second electrode 16 in a reflection region 12R. A difference between the present embodiment and the previously described embodiments is that the light absorbing is carried out by the light-absorbing layer 32A instead of the first electrode 14, and the light reflecting is carried out by the reflective layer 32R instead of the second electrode 16 in accordance to the present embodiment. Therefore, the first electrode 14 and the second electrode 16 may be fabricated using a same conductive layer, for example a same metallic layer. Also, electrical conductivities of the materials for the conductive layer may be optimized during material selections.

Figure 7:
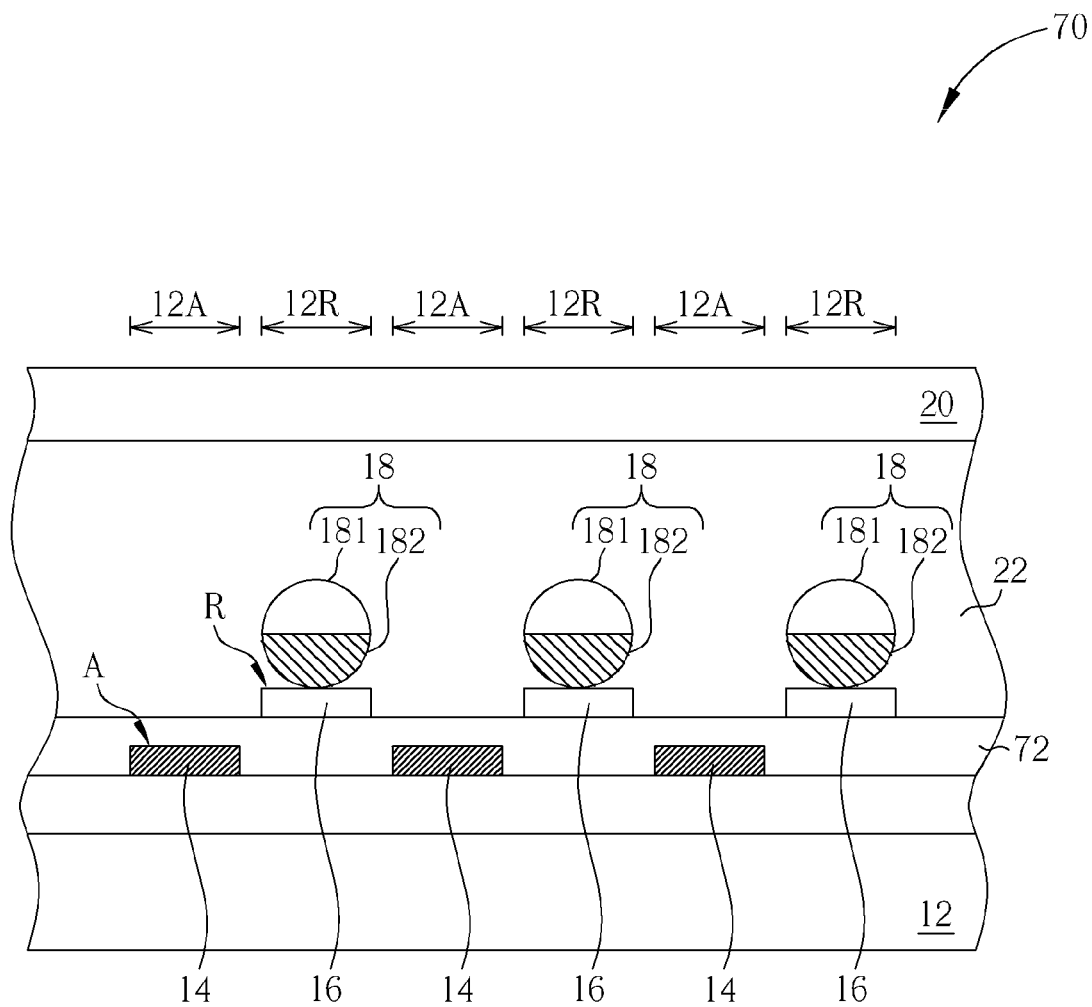
FIG. 7 is a schematic diagram of the pixel structure of the display device in accordance to another preferred embodiment of the present invention.

Referring to FIG. 7, FIG. 7 is a schematic diagram of the pixel structure of the display device in accordance to another preferred embodiment of the present invention. As illustrated in FIG. 7, a pixel structure 70 of the display device in accordance to the present embodiment further includes an insulating layer 72 disposed between a first electrode 14 and a second electrode 16 so that the first electrode 14 and the second electrode 16 are disposed on different planes. As an example, the first electrode 14 is made of a first metallic layer, and the second electrode 16 is made of a second metallic layer; therefore, the second electrode 16 may be disposed above the first electrode 14, but is not limited. The method described above disposes the first electrode 14 and the second electrode 16 on different planes. Disposing the first electrode 14 and the second electrode 16 on different planes makes it possible to align the first electrode 14 and the second electrode 16 closer with each other, which enhances the ability to control the electric field.

Figure 8:
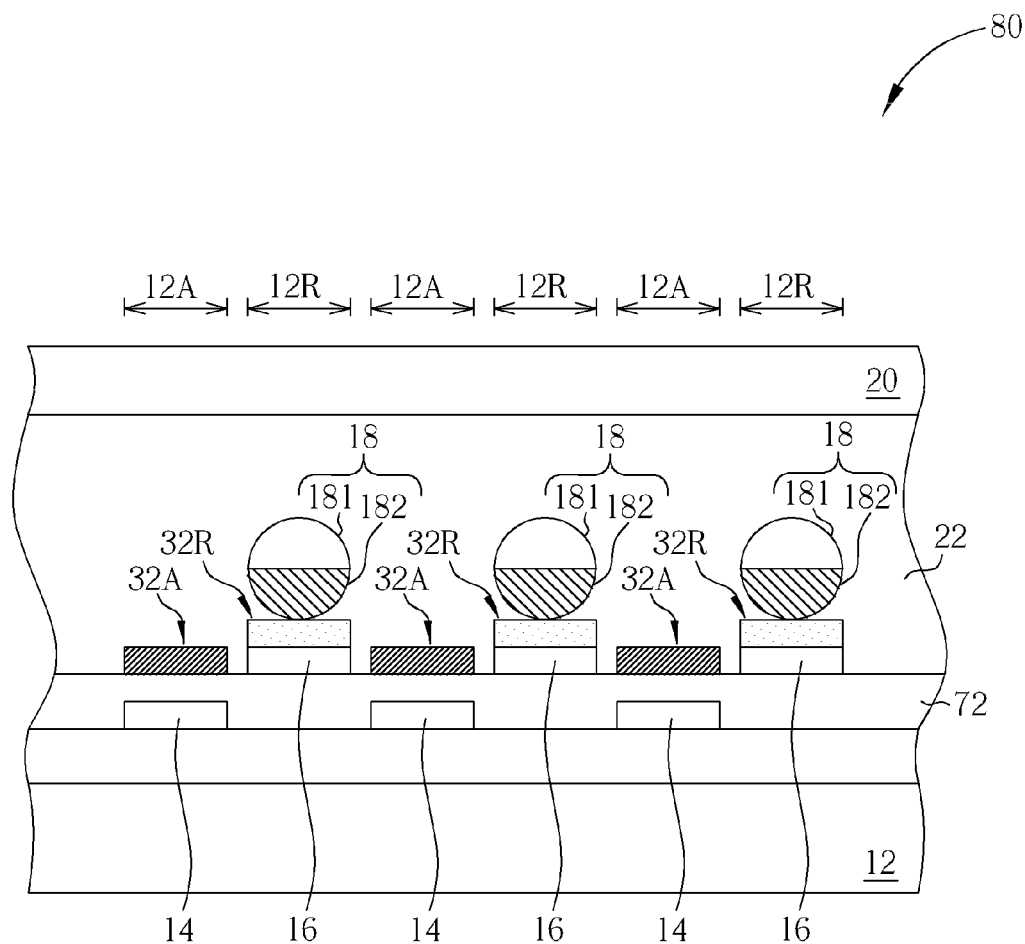
FIG. 8 is a schematic diagram of the pixel structure of the display device in accordance to another preferred embodiment of the present invention.

Referring to FIG. 8, FIG. 8 is a schematic diagram of the pixel structure of the display device in accordance to another preferred embodiment of the present invention. As illustrated in FIG. 8, a difference between the present embodiment and the previously described embodiments is that a pixel structure 80 of the display device in accordance to the present embodiment further includes a light-absorbing layer 32A and a reflective layer 32R. The light-absorbing layer 32A is disposed on an insulating layer 72, and the light-absorbing layer 32A is disposed corresponding to positions of a first electrode 14. The reflective layer 32R is disposed on a second electrode 16.

Figure 9:
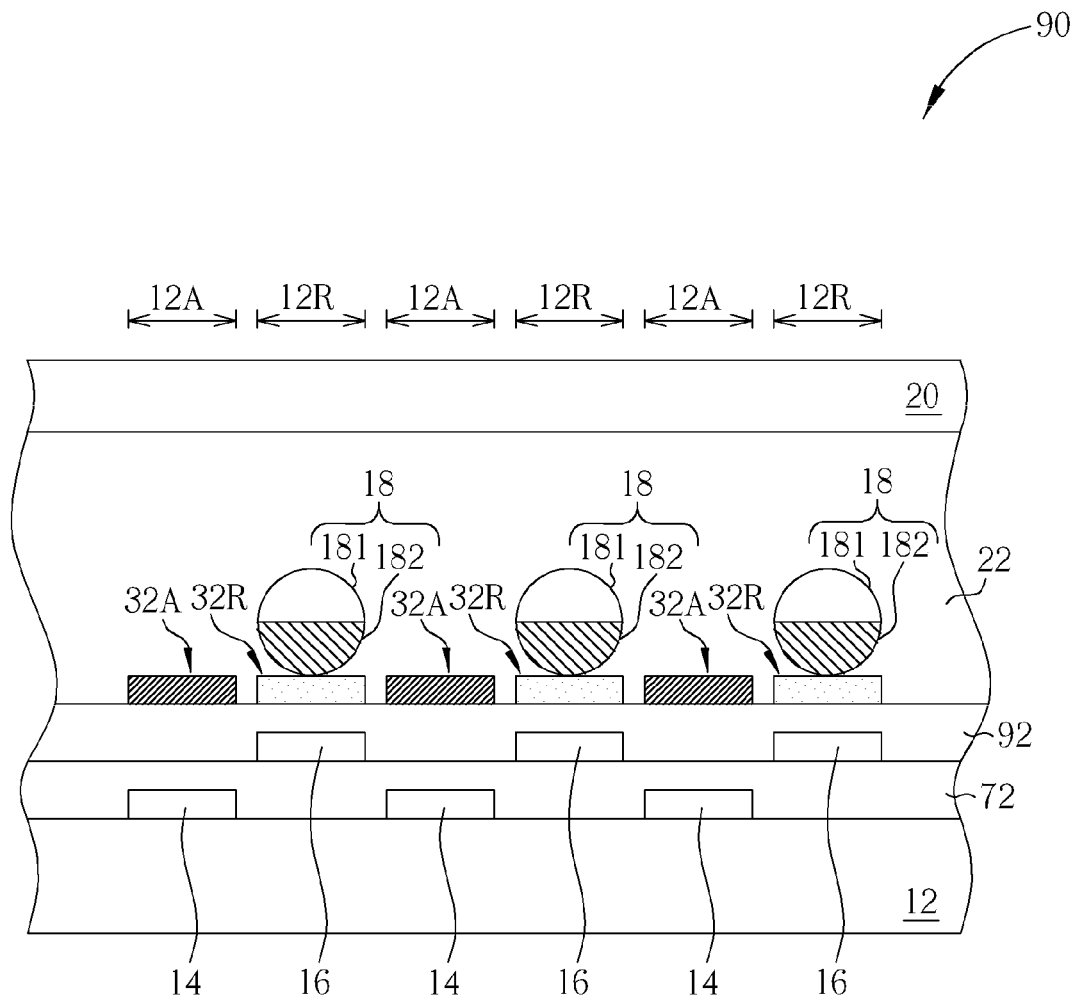
FIG. 9 is a schematic diagram of the pixel structure of the display device in accordance to another preferred embodiment of the present invention.

Referring to FIG. 9, FIG. 9 is a schematic diagram of the pixel structure of the display device in accordance to another preferred embodiment of the present invention. As illustrated in FIG. 9, a difference between the present embodiment and the previously described embodiments is that a pixel structure 90 further includes an insulating layer 92 disposed on an insulating layer 72 and a second electrode 16. A light-absorbing layer 32A in accordance to the present embodiment is disposed on the insulating layer 92, and the light-absorbing layer 32A is disposed corresponding to positions of the first electrode 14. A reflective layer 32R in accordance to the present embodiment is disposed on the insulating layer 92, and the reflective layer 32R is disposed corresponding to positions of a second electrode 16.

Figure 10:
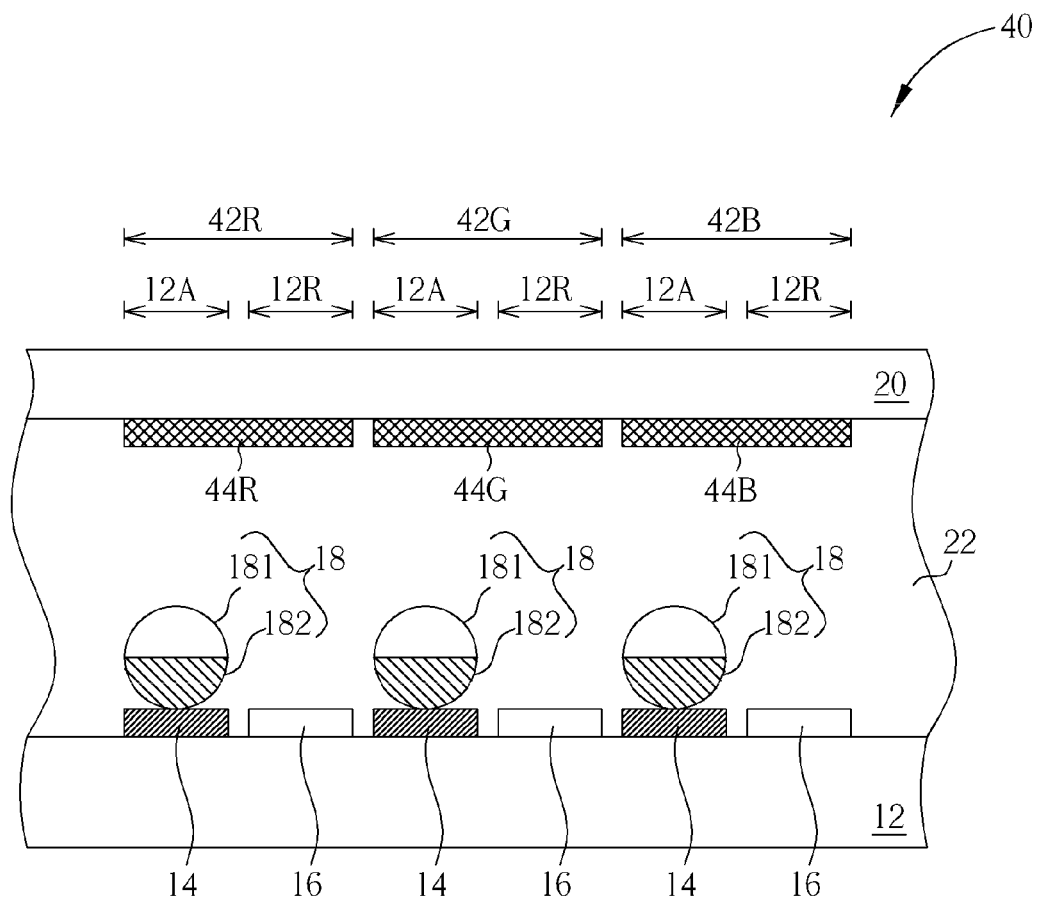
FIG. 10 is a schematic diagram of a pixel structure of the display device in accordance to another preferred embodiment of the present invention.

Other than black and white image displays, the display device in accordance to the present invention can also display images with another color or colorful images. Referring to FIG. 10, FIG. 10 is a schematic diagram of a pixel structure of the display device in accordance to another preferred embodiment of the present invention. As illustrated in FIG. 10, a pixel structure 40 of the display device in accordance to the present embodiment further includes a plurality of sub-pixel structures (e.g. a red sub-pixel structure 42R, a green sub-pixel structure 42G, and a blue sub-pixel structure 42B) disposed on a substrate 20, and a plurality of color filters (e.g. a red color filter 44R, a green color filter 44G, and a blue color filter 44B) disposed on the substrate 20. The red color filters 44R, the green color filter 44G and the blue color filter 44B are corresponded to the red sub-pixel structure 42R, the green sub-pixel structure 42G, and the blue sub-pixel structure 42B respectively. For example, if a red color display is desired, the sub-pixel structure 42R corresponding to the red color filter 44R would show the bright state, and the green sub-pixel structure 42G and the blue sub-pixel structure 42B would show the dark states so that the pixel structure 40 can display the color red. Similar to the method described above, the pixel structure 40 could adjust the grey scale value of each of the sub-pixel structures in order to display images of another color or colorful images. It is to be noted that the red color filter 44R, the green color filter 44G, and the blue color filter 44B are disposed on the substrate 20, but is not limited; the red color filter 44R, the green color filter 44G, and the blue color filter 44B may also be disposed on the substrate 12.

In summary, the display device in accordance to the present invention may be a paper-like flexible display device. The display device includes a pixel structure including a light-absorption region and a reflection region. The light-absorption region and the reflection region have electrodes with different polarities, and the different polarities may be achieved by applying different voltages. In the bright state, the charge-carrying balls are attracted to the light-absorption region, and the white portions of the charge-carrying balls face the display side to show the bright state. However, in the dark state, the charge-carrying balls are attracted to the reflection region, and the black portions of the charge-carrying balls face the display side to show the dark state. Furthermore, with the installation of color filters, the display device of the present invention can also provide color display features.

Those skilled in the art will readily observe that numerous modifications and alterations of the device and method may be made while retaining the teachings of the invention.

What is claimed is:

1. A pixel structure, comprising:
a substrate, comprising a light-absorption region and a reflection region;
a first electrode, disposed in the light-absorption region of the substrate;
a second electrode, disposed in the reflection region of the substrate; and
a plurality of charge-carrying balls, disposed on the first electrode and the second electrode, each of the charge-carrying balls comprising a white portion and a black portion, wherein the white portion has a first conductive type and the black portion has a second conductive type.

2. The pixel structure of claim 1, wherein in a bright display state, the first electrode has a voltage of the first conductive type, the charge-carrying balls are substantially disposed in the light-absorption region, the black portion of each of the charge-carrying balls is attracted by the first electrode, the black portion of each of the charge-carrying balls is substantially aligned facing a side of the first electrode, and the white portion of each of the charge-carrying balls is substantially aligned facing an opposite side with respect to the first electrode.

3. The pixel structure of claim 1, wherein in a dark display state, the second electrode has a voltage of the second conductive type, the charge-carrying balls are substantially disposed in the reflection region, the white portion of each of the charge-carrying balls is attracted by the second electrode, the white portion of each of the charge-carrying balls is substantially aligned facing a side of the second electrode, and the black portion of each of the charge-carrying balls is substantially aligned facing an opposite side to the second electrode.

4. The pixel structure of claim 1, wherein the first electrode comprises a plurality of first bar electrodes, the second electrode comprises a plurality of second bar electrodes, and the first bar electrodes and the second bar electrodes are interdigitatedly arranged.

5. The pixel structure of claim 1, wherein a material of the first electrode comprises a light-absorbing conductive material.

6. The pixel structure of claim 1, wherein a material of the second electrode comprises a reflective conductive material.

7. The pixel structure of claim 1, further comprising a light-absorbing layer disposed on the first electrode in the light-absorption region.

8. The pixel structure of claim 1, further comprising a reflective layer disposed on the second electrode in the reflection region.

9. The pixel structure of claim 1, wherein the white portion comprises a plurality of white particles, and the black portion comprises a plurality of black particles.

10. The pixel structure of claim 1, wherein the white portion is a white hemisphere, and the black portion is a black hemisphere.

11. The pixel structure of claim 1, wherein the first electrode and the second electrode are substantially disposed on a same plane.

12. The pixel structure of claim 1, wherein the first electrode and the second electrode are disposed on different planes, and the pixel structure further comprises an insulating layer disposed between the first electrode and the second electrode.

13. A display device, comprising a plurality of pixel structures disposed on a substrate, each of the pixel structures comprising a plurality of sub-pixel structures, each of the sub-pixel structures comprising:
- a light-absorption region and a reflection region;
- a first electrode, disposed in the light-absorption region of the substrate;
- a second electrode, disposed in the reflection region of the substrate; and
- a plurality of charge-carrying balls, disposed on the first electrode and the second electrode, each of the charge-carrying balls comprising a white portion and a black portion, wherein the white portion has a first conductive type and the black portion has a second conductive type.

14. The display device of claim 13, wherein when each of the sub-pixel structures shows a bright display state, the first electrode has a voltage of the first conductive type, the charge-carrying balls are substantially disposed in the light-absorption region, the black portion of each of the charge-carrying balls is substantially aligned facing a side of the first electrode, and the white portion of each of the charge-carrying balls is substantially aligned facing an opposite side with respect to the first electrode.

15. The display device of claim 13, wherein when each of the sub-pixel structure shows a dark display state, the second electrode has a voltage of the second conductive type, the charge-carrying balls are substantially disposed in the reflection region, the white portion of each of the charge-carrying balls is substantially aligned facing a side of the second electrode, and the black portion of each of the charge-carrying balls is substantially aligned facing an opposite side with respect to the second electrode.

16. The display device of claim 13, wherein the first electrode of each of the sub-pixel structures comprises a plurality of first bar electrodes, the second electrode of each of the sub-pixel structures comprises a plurality of second bar electrodes, and the first bar electrodes and the second bar electrodes are interdigitatedly arranged.

17. The display device of claim 13, wherein a material of the first electrode of each of the sub-pixel structures comprises a light-absorbing conductive material.

18. The display device of claim 13, wherein a material of the second electrode of each of the sub-pixel structures comprises a reflective conductive material.

19. The display device of claim 13, further comprising a plurality of light-absorbing layers respectively disposed on the first electrode in the light-absorption region of each of the sub-pixel structures.

20. The display device of claim 13, further comprising a plurality of reflective layers respectively disposed on the second electrode in the reflection region of each of the sub-pixel structures.

21. The display device of claim 13, further comprising a plurality of color filters respectively disposed in the sub-pixel structures.

22. The display device of claim 13, wherein the first electrode and the second electrode are substantially disposed on a same plane.

23. The display device of claim 13, wherein the first electrode and the second electrode are disposed on different planes, and the display device further comprises an insulating layer disposed between the first electrode and the second electrode.

24. The display device of claim 13, wherein the white portion comprises a plurality of white particles, and the black portion comprises a plurality of black particles.

25. The display device of claim 13, wherein the white portion is a white hemisphere, and the black portion is a black hemisphere.

* * * * *